US012673720B2

(12) United States Patent (10) Patent No.: US 12,673,720 B2
Okada et al. (45) **Date of Patent: \*Jul. 7, 2026**

(54) STEERING CONTROL APPARATUS

(71) Applicants: JTEKT CORPORATION, Kariya (JP); TOYOTA JIDOSHA KABUSHIKI KAISHA, Toyota (JP)

(72) Inventors: Kotaro Okada, Kashiba (JP); Kazuki Itazuri, Toyota (JP)

(73) Assignees: JTEKT CORPORATION, Kariya (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 379 days.

This patent is subject to a terminal disclaimer.

(21) Appl. No.: 18/508,520

(22) Filed: Nov. 14, 2023

(65) Prior Publication Data

US 2024/0158005 A1 May 16, 2024

(30) Foreign Application Priority Data

Nov. 16, 2022 (JP) ................................. 2022-183601

(51) Int. Cl.
  *B62D 6/00* (2006.01)
  *B62D 1/28* (2006.01)
  *B62D 5/00* (2006.01)
(52) U.S. Cl.
  CPC ............. *B62D 6/002* (2013.01); *B62D 1/283* (2013.01); *B62D 5/006* (2013.01); *B62D 6/008* (2013.01)
(58) Field of Classification Search
  CPC ........ B62D 6/002; B62D 1/283; B62D 5/006; B62D 6/008
  See application file for complete search history.

(56) References Cited

U.S. PATENT DOCUMENTS

| | | | |
|---|---|---|---|
| 12,330,732 B2 * | 6/2025 | Angenete | ........... B62D 15/0215 |
| 12,391,309 B2 * | 8/2025 | Okada | .................... B62D 6/008 |
| 2014/0032049 A1 | 1/2014 | Moshchuk et al. | |

FOREIGN PATENT DOCUMENTS

| | | |
|---|---|---|
| EP | 0806336 B1 | 11/1997 |
| JP | 4729807 B2 | 7/2011 |
| JP | 2022-068056 A | 5/2022 |
| WO | 2022/128103 A1 | 6/2022 |

OTHER PUBLICATIONS

Apr. 25, 2024 Search Report issued in European Patent Application No. 23209998.6.
Oct. 1, 14, 2024 Office Action issued in European Patent Application No. 23209998.6.

* cited by examiner

*Primary Examiner* — Faye M Fleming
(74) *Attorney, Agent, or Firm* — Oliff PLC

(57) ABSTRACT

A steering control apparatus includes a processing unit configured to execute, a target steering angle variable acquiring processing of acquiring a value of a target steering angle variable, a target steering angle correcting processing of correcting the value of the target steering angle variable by a play compensation amount according to a steering direction, a gradually changing processing of gradually changing a magnitude of the play compensation amount, and a steering angle control of operating the motor through control with a steering angle according to a rotation angle of the steering shaft being as a control amount and with the value of the target steering angle variable being as a target value of the control amount.

4 Claims, 7 Drawing Sheets

FIG. 1

STEERING CONTROL APPARATUS

CROSS-REFERENCE TO RELATED APPLICATION

This application claims priority to Japanese Patent Application No. 2022-183601 filed on Nov. 16, 2022, incorporated herein by reference in its entirety.

BACKGROUND

1. Technical Field

The present disclosure relates to a steering control apparatus.

2. Description of Related Art

For example, Japanese Unexamined Patent Application Publication No. 2022-68056 discloses a control apparatus that corrects a target steering angle in accordance with a steering direction. This apparatus corrects, in the case where a scheduled steering direction is a right steering direction, the target steering angle by a play amount which is a value in the right steering direction. The play amount is the maximum value of an amount by which the steering angle can be changed without changing the turning angle of turned wheels.

SUMMARY

When the target steering angle is corrected in accordance with the steering direction as above, there is a concern that the magnitude of a change amount of the correction amount of the target steering angle when the steering direction is changed is excessively large.

1. A steering control apparatus according to the present disclosure controls a steering system. The steering system includes a steering shaft, a turned wheel of a vehicle, the turned wheel being turned along with rotation of the steering shaft, and a motor that rotates the steering shaft. The steering control apparatus includes a processing unit configured to execute target steering angle variable acquiring processing, target steering angle correcting processing, gradually changing processing, and steering angle control processing. The target steering angle variable acquiring processing is processing of acquiring a value of a target steering angle variable, and the target steering angle variable is a variable indicating a target value of a turning angle of the turned wheel. The target steering angle correcting processing is processing of correcting the value of the target steering angle variable by a play compensation amount according to a steering direction, and the steering direction is a direction in which the value of the target steering angle variable changes. The gradually changing processing is processing of gradually changing a magnitude of the play compensation amount that is set for correcting the value of the target steering angle variable along with a change of the steering direction. The steering angle control processing is processing of operating the motor through control with a steering angle according to a rotation angle of the steering shaft being as a control amount and with the value of the target steering angle variable being as a target value of the control amount.

With the gradually changing processing, the magnitude of the play compensation amount when the steering direction is changed gradually changes. Therefore, when the steering direction is changed, a changing speed of the magnitude of the correction amount of the value of the target steering variable may be limited to a smaller side than in the case where the play compensation amount is changed stepwise.

2. The gradually changing processing may be processing of defining a changing speed of the magnitude of the play compensation amount in accordance with a magnitude of a changing speed of the value of the target steering angle variable, and may include processing of setting the changing speed of the magnitude of the play compensation amount in the case where the magnitude of the changing speed of the value of the target steering angle variable is large to be not less than the changing speed of the magnitude of the play compensation amount in the case where the magnitude of changing speed of the value of the target steering angle variable is small.

With the aforementioned configuration, the changing speed of the magnitude of the play compensation amount is set to have positive correlation with the magnitude of the changing speed of the value of the target steering variable. As the changing speed of the magnitude of the play compensation amount is larger, responsiveness of the turning angle to steering is enhanced more. Meanwhile, when the changing speed of the value of the target steering angle variable is large, rapidness of the change of the turning angle is requested more than in the case of being small. Therefore, with the aforementioned configuration, in a situation that the rapidness of the change of the turning angle is requested, the request can be handled.

3. The gradually changing processing may include processing of gradually increasing a changing speed of the magnitude of the play compensation amount along with the change of the steering direction. With the aforementioned configuration, the magnitude of the changing speed of the play compensation amount set along with the change of the steering direction is gradually increased. Therefore, the play compensation amount can be moved to a desired value as rapid as possible while the correction amount of the value of the target steering angle variable is restrained from suddenly changing along with the change of the steering direction.

4. The processing unit may be configured to perform the steering angle control processing in an autonomous steering mode. The processing unit may be configured to perform play displacement calculating processing and basic amount setting processing. The play displacement calculating processing may be processing of calculating a play displacement in accordance with each change of the steering angle and the play displacement may be an amount for specifying a position in a region where the turning angle does not change with respect to the change of the steering angle. The basic amount setting processing may be processing of setting a basic amount of play according to a right steering direction and a basic amount of play according to a left steering direction to amounts for setting the steering angle to a value of an end part of the region, in accordance with the play displacement at the time point of entering the autonomous steering mode. The gradually changing processing may be processing of gradually changing the play compensation amount to the basic amount of play.

Since being for correcting the value of the target steering angle variable to the end part of the region where the turning angle does not change with respect to the change of the steering angle, the basic amount of play is an appropriate compensation amount for controlling the turning angle in accordance with steering. Further, with the gradually changing processing, the play compensation amount can be gradually brought close to the basic amount of play. Accordingly, according to the aforementioned configuration, the play compensation amount can be brought close to the appropriate compensation amount for controlling the turning angle in accordance with steering.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein:

FIG. 1 is a block diagram showing a configuration of a steering system according to a first embodiment;

DETAILED DESCRIPTION OF EMBODIMENTS

First Embodiment

Prerequisite Configuration

Figure 1:
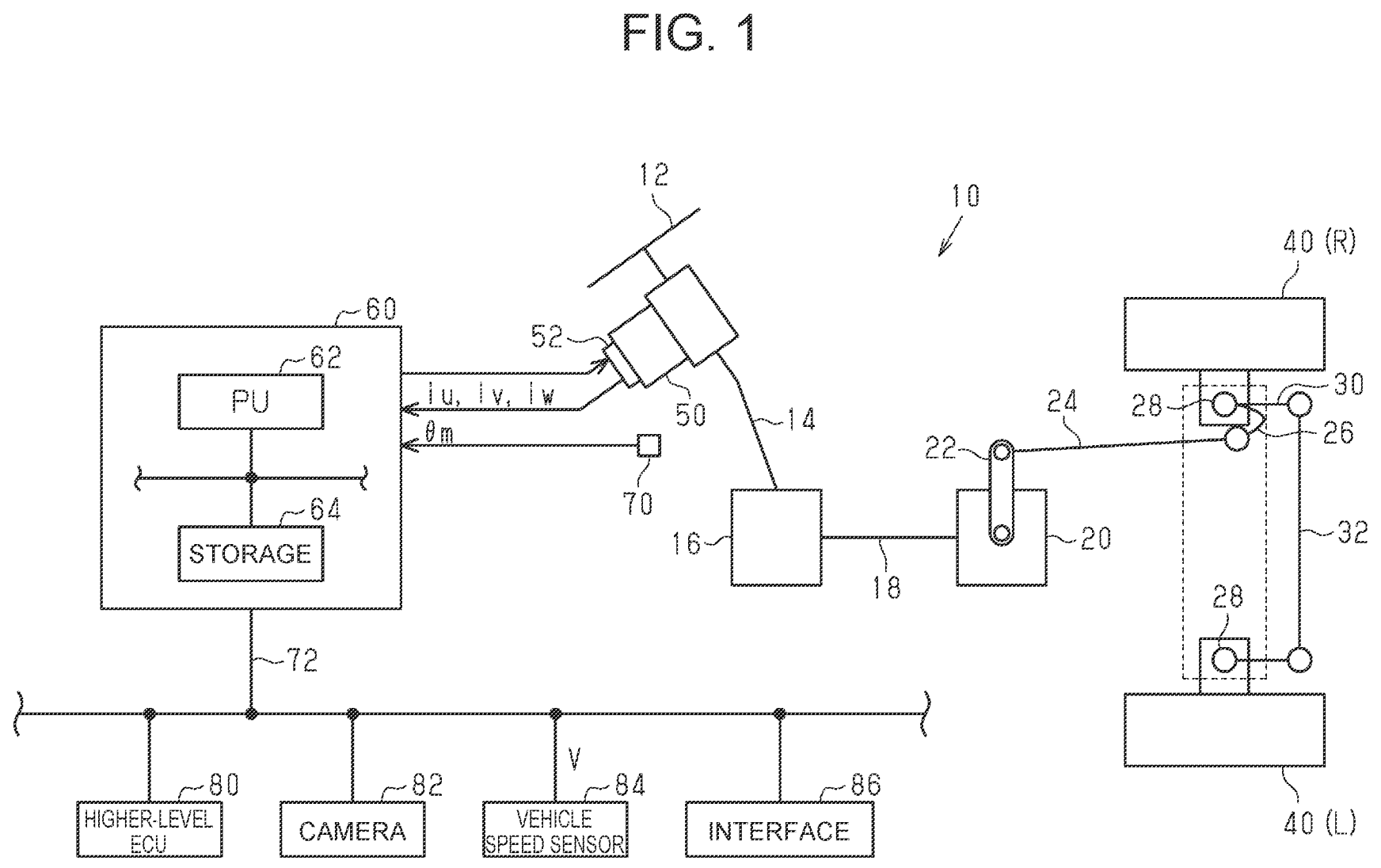
Figure 2:
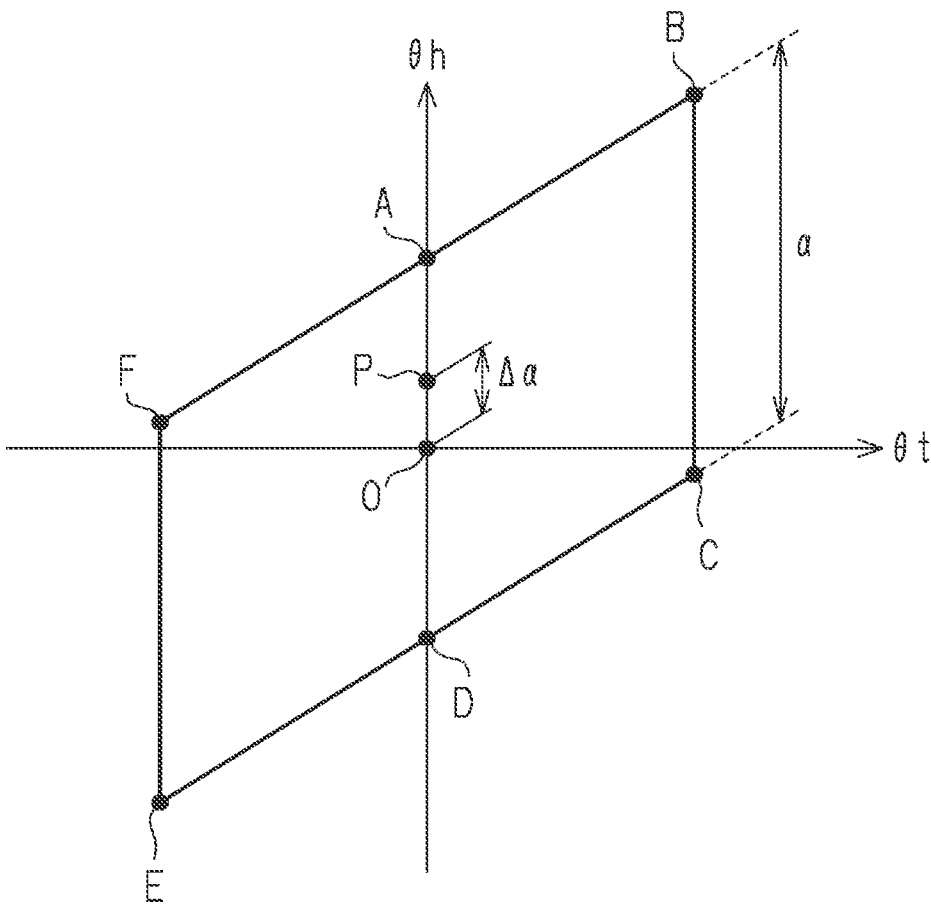
FIG. 2 is a diagram showing relationship between a steering angle and a turning angle according to the embodiment.

Hereafter, a first embodiment is described with reference to the drawings. A steering system 10 shown in FIG. 1 includes a steering wheel 12. A steering shaft 14 is joined to the steering wheel 12. An end part, of the steering shaft 14, that is on the opposite side to the steering wheel 12 is joined to an input shaft of a bevel gear part 16. An output shaft of the bevel gear part 16 is joined to an input shaft of a hydraulic power steering apparatus 20 via a motive power transmission shaft 18. A sector shaft of the hydraulic power steering apparatus 20 is joined to one end part of a pitman arm 22. Another end part of the pitman arm 22 is joined to one end part of a drag link 24. Another end part of the drag link 24 is joined to one end part of a steering knuckle arm 26. Another end part of the steering knuckle arm 26 is joined to a kingpin shaft 28 of a right turned wheel 40(R). The kingpin shaft 28 of the right turned wheel 40(R) and a kingpin shaft 28 of a left turned wheel 40(L) are joined with tie rod arms 30 and a tie rod 32.

Rotational motive power of a motor 50 is transmitted to the steering shaft 14. An example of the motor 50 is a synchronous traction motor. Output voltage of an inverter 52 is applied to terminals of the motor 50.

A steering control apparatus 60 takes the steering system 10 as a control target. For control of the control target, the steering control apparatus 60 refers to a rotation angle θm of the motor 50 detected by a rotation angle sensor 70. Moreover, the steering control apparatus 60 refers to currents iu, iv, iw flowing through the terminals of the motor 50. The currents iu, iv, iw may be detected, for example, as amounts of voltage drop of shunt resistors provided on legs of the inverter 52. Via a network 72, the steering control apparatus 60 refers to a vehicle speed V detected by a vehicle speed sensor 84.

The steering control apparatus 60 can communicate with a higher-level ECU 80 via the network 72. Independently of instruction of steering with manipulation of the steering wheel 12, the higher-level ECU 80 performs processing of generating a command for intervening in steering of the vehicle. In other words, the higher-level ECU 80 performs autonomous steering processing. The autonomous steering processing of the present embodiment is processing of performing, when the vehicle is likely to depart from a traffic lane caused by driver's manipulation of the steering wheel 12, steering intervention in order to relieve the situation. In order to perform the autonomous steering processing, the higher-level ECU 80 acquires image data ahead of the vehicle captured by a camera 82. Moreover, the higher-level ECU 80 grasps the indication of intention, input by the driver via an interface 86, that the autonomous steering processing may or may not be performed.

The steering control apparatus 60 includes a processing unit 62 (hereafter, PU 62) and a storage 64. The PU 62 is a software processing unit such as a CPU, a GPU, and a TPU. The storage 64 may be an electrically non-rewritable non-volatile memory. Otherwise, the storage 64 may be an electrically rewritable nonvolatile memory and a storage medium such as a disc medium. The steering control apparatus 60 performs processing of controlling the control target by the PU 62 executing a program stored in the storage 64.

Characteristics of Steering System 10

Caused by inclusion of a complex link mechanism, in the steering system 10, what is called play, by which the turned wheels 40 are not turned in response to rotation of the steering shaft 14, is large.

FIG. 2 shows relationship between a steering angle θh and a turning angle θt. Herein, the steering angle θh is a rotation angle of the steering shaft 14. Meanwhile, the turning angle θt is a turned angle of the wheel regarding the turned wheel 40. Moreover, a neutral position O illustrated in FIG. 2 is a point where both the steering angle θh and the turning angle θt are zero. This means that both the steering angle θh and the turning angle θt indicate a rectilinear direction. Hereafter, the rotation angle that is in a right turning direction is set to be positive, and the rotation angle that is in a left turning direction is set to be negative.

As shown in FIG. 2, the turning angle θt does not change until, even when the steering angle θh is changed from the neutral position O in the right turning direction, reaching point A. Then, the turning angle θt increases after the steering angle θh further takes a larger value than point A.

Moreover, the turning angle θt does not change even when the steering angle θh is decreased at point B. In other words, the turning angle θt does not change even when a steering direction is switched to the left side at point B. Note that the steering direction is a direction that a rotation speed of the steering shaft 14 indicates. Then, the turning angle θt decreases after the steering angle θh exceeds point C to take a smaller value further. In other words, the turning angle θt decreases when the absolute value of the steering angle θh, which has a negative value, is further increased to be large exceeding point C.

Then, the steering angle θh takes a negative value at point D where the turning angle θt is zero. Point E is a value obtained by further displacing the steering angle θh in a left steering direction even after the turning angle θt reaches zero. The turning angle θt does not change until, even when the steering angle θh is increased at point E, the steering angle θh reaches point F. The turning angle θt increases after the steering angle θh is further increased to be large exceeding point F.

As above, for example, in the case of positioning at point B, even when the steering angle θh is changed between point B and point C, the turning angle θt does not change. Moreover, for example, in the case of positioning at point E, even when the steering angle θh is changed between point E and point F, the turning angle θt does not change. As above, caused by the play of the steering system 10, there exists a region where the turning angle θt does not change with respect to the change of the steering angle θh. Note that the region is not a region that has fixed values of the steering angle θh but a region that can change in accordance with a history of changes of the steering angle θh.

A displacement of the steering angle θh from point B to point C occurs in turning-back from right turning. Moreover, a displacement of the steering angle θh from point E to point F occurs in turning-back from left turning. A length of the region where the turning angle θt does not change with respect to the change of the steering angle θh in each turning-back is illustrated as "α" in FIG. 2. "α" is beforehand stored in the storage 64. For example, "α" may be a fixed value. Otherwise, for example, "α" may be a value updated each time. Update processing of "α" can be performed, for example, as follows.

1. During the vehicle being stopped, the PU 62 controls the rotation angle of the motor 50 to rotate the steering shaft 14. 2. The PU 62 specifies each end part of the region with the rotation angle of the motor 50 immediately before a current flowing in the motor 50 exceeds a threshold with respect to rotation of the motor 50.

By performing the control of the rotation angle of the motor 50 in "1." and "2." above both in a right rotation and in a left rotation, the PU 62 estimates "α". With "α" thus estimated, the PU 62 updates "α" stored in the storage 64. For example, the PU 62 may store estimated "α" in the storage 64. Otherwise, for example, the PU 62 may store a weighted average processing value of estimated "α" and "α" stored in the storage 64, newly in the storage 64.

Setting of Basic Amount of Play

The region causes a factor of lowering responsiveness of the change of the turning angle θt to the change of the steering angle θh. Therefore, in the present embodiment, such lowering of the responsiveness is reduced with a play compensation amount. First, setting of a basic amount of play as a basic amount for calculating the play compensation amount is herein described.

Figure 3:
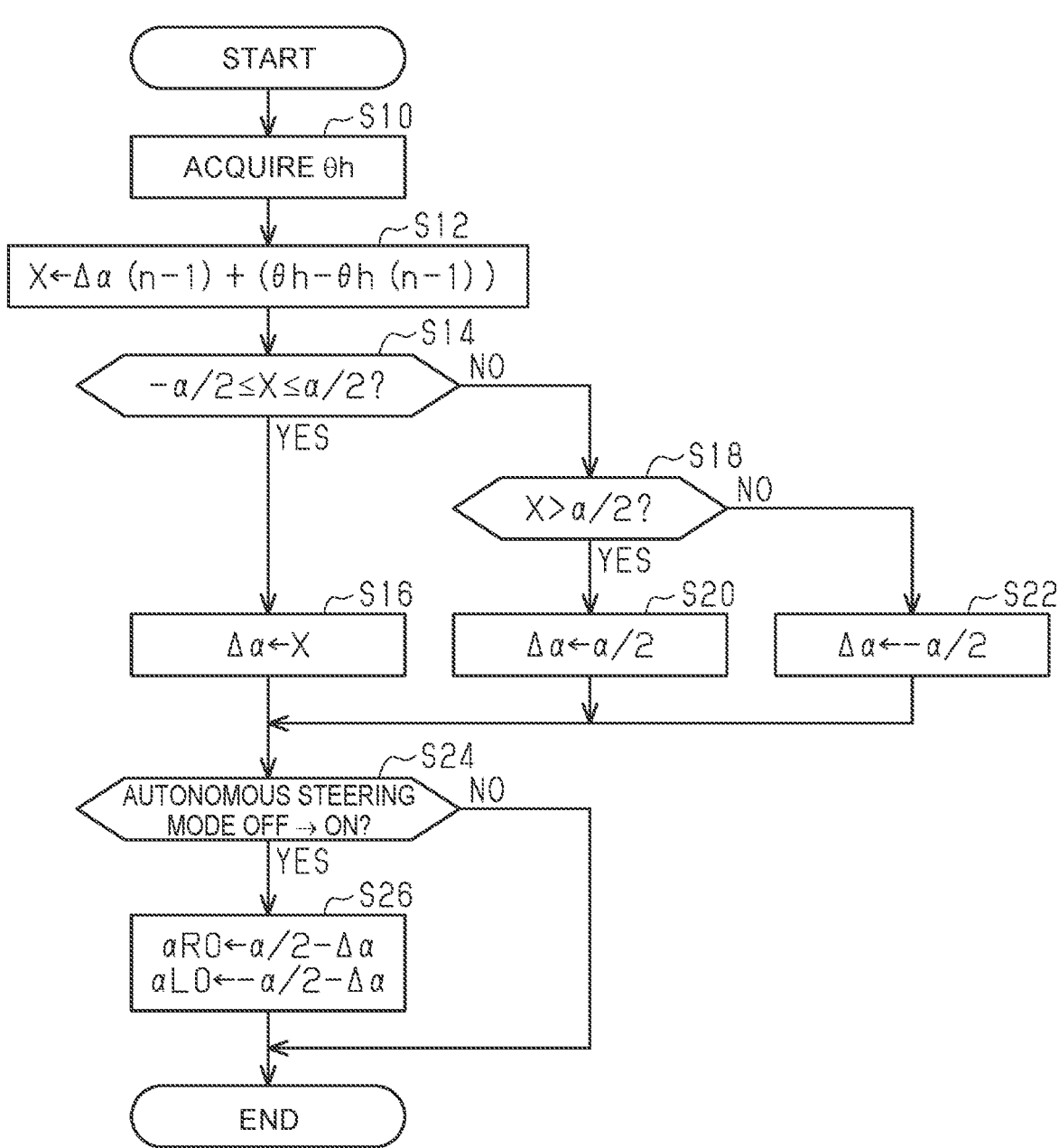
FIG. 3 is a flowchart showing a procedure of processes performed by a control apparatus according to the embodiment.

FIG. 3 shows a procedure of processes regarding the setting of the basic amount of play. The processes shown in FIG. 3 are implemented by the PU 62 repeatedly executing a program stored in the storage 64, for example, in predetermined cycles. Hereafter, step numbers of the processes are expressed by numerals preceded by the letter "S".

In the series of processes shown in FIG. 3, the PU 62 acquires the steering angle θh (S10). The steering angle θh is calculated through integration processing of the rotation angle θm by the PU 62. Next, the PU 62 calculates a variable X for calculating a play displacement by the following expression (S12). $X \leftarrow \Delta\alpha(n-1)+(\theta h-\theta h(n-1))$ In the above expression, "n−1" means a value in performance timing previous to performance timing of the series of processes shown in FIG. 3. Namely, "$\Delta\alpha(n-1)$" means the play displacement $\Delta\alpha$ in the previous performance timing of the series of processes shown in FIG. 3. Moreover, "θh(n−

1)" means the value acquired in the process of S10 in the previous performance timing of the series of processes shown in FIG. 3.

FIG. 2 exemplarily shows the play displacement $\Delta\alpha$. FIG. 2 shows a state where the steering angle θh reaches the position of point P by turning the steering angle θh from the neutral position O to the right by the play displacement $\Delta\alpha$. With return to FIG. 3, the PU 62 determines whether or not the value of the variable X is not less than "−α/2" and not more than "α/2" (S14). In the case of affirmative determination in the process of S14, the PU 62 substitutes the value of the variable X for the play displacement $\Delta\alpha$ (S16).

On the other hand, in the case of negative determination in the process of S14, the PU 62 determines whether or not the value of the variable X is larger than "α/2" (S18). When it is determined that the value of the variable X is larger than "α/2" (S18: YES), the PU 62 substitutes "α/2" for the play displacement $\Delta\alpha$ (S20). This process corresponds to a situation that the steering angle θh is turned largely to the right exceeding point A, for example, in FIG. 2. In such a case, the play displacement $\Delta\alpha$ is positioned at the end part, in a right steering direction, of the region where the turning angle θt does not change with respect to the change of the steering angle θh. When the length of the region is defined as "α" and the center of the region as "zero", the play displacement $\Delta\alpha$ at the end part of the region in the right steering direction is "α/2".

On the other hand, in the case of negative determination in the process of S18, the PU 62 substitutes "−α2" for the play displacement $\Delta\alpha$ (S22). When the process of S16, S20, S22 is completed, the PU 62 determines whether or not switch to an autonomous steering mode has been made (S24). The autonomous steering mode is a mode of performing the aforementioned autonomous steering processing. In the autonomous steering mode, the higher-level ECU 80 outputs a target angle θt* to the steering control apparatus 60. The target angle θt* is a variable indicating a target value of the turning angle of the turned wheel 40. Note that a change amount of the target angle θt* is quantified so as to be equal to a change amount of the steering angle θh between point F and point B or between point C and point E shown in FIG. 2.

When it is determined that the switch has been made (S24: YES), the PU 62 sets a right basic amount of play αR0 and a left basic amount of play αL0 (S26). Namely, the PU 62 substitutes "α/2−Δα" for the right basic amount of play αR0. Moreover, the PU 62 substitutes "−α/2−Δα" for the left basic amount of play αL0.

When the play displacement $\Delta\alpha$ is positioned, for example, at point P shown in FIG. 2 at the time point of the switch to the autonomous steering mode, the turning angle does not change until the steering angle θh is changed by "α/2−Δα" even when the change of the target angle θt* is in the right steering direction. Therefore, in order to enhance responsiveness of the turning angle to the change of the target angle θt*, it is desirable to correct the target angle θt* by "α/2−Δα" through open-loop control along with the change of the target angle θt* in the right steering direction. Therefore, the PU 62 substitutes "α/2−Δα" for the right basic amount of play αR0. Moreover, when the play displacement $\Delta\alpha$ is positioned at point P, the turning angle does not change until the steering angle θh is changed by "−α/2−Δα" even when the target angle θt* is changed in the left steering direction. Therefore, in order to enhance responsiveness of the turning angle to the change of the target angle θt*, it is desirable to correct the target angle θt* by "−α/2−Δα" through open-loop control along with the change of the target angle θt* in the left steering direction. Therefore, the PU 62 substitutes "−α/2−Δα" for the left basic amount of play αL0.

Setting of Play Compensation Amount

Figure 4:
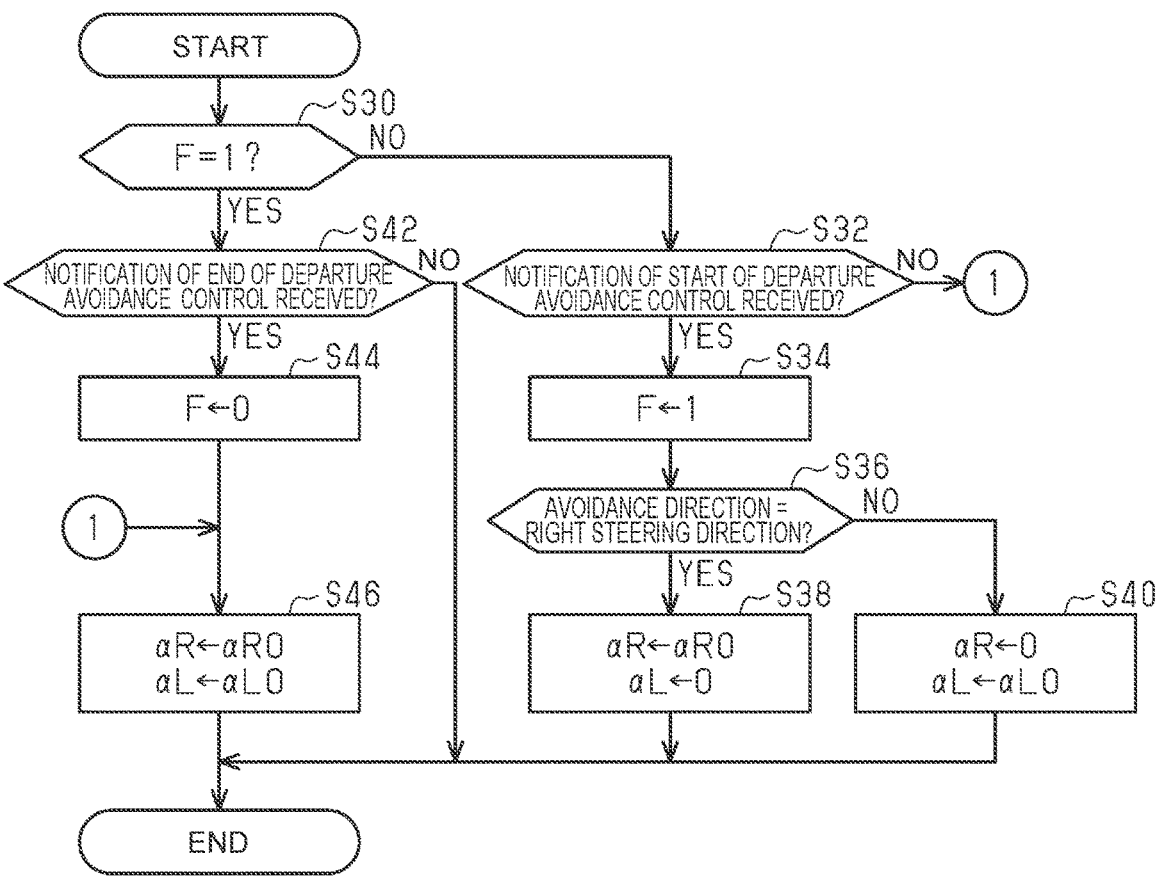
FIG. 4 is a flowchart showing a procedure of processes performed by the control apparatus according to the embodiment.

Both when the process of S26 is completed and in the case of negative determination in the process of S24, the PU 62 tentatively ends the series of processes shown in FIG. 3. FIG. 4 shows a procedure of processes regarding setting of the play compensation amount. The processes shown in FIG. 4 are implemented by the PU 62, in the autonomous steering mode, repeatedly executing a program stored in the storage 64, for example, in predetermined cycles.

In the series of processes shown in FIG. 4, first, the PU 62 determines whether or not a flag F is "one" (S30). In the case of being "one", the flag F indicates that steering intervening processing for restraining the vehicle from departing from the traffic lane is being performed. In the case of being "zero", the flag F indicates that the steering intervening processing is not being performed.

When it is determined that the flag F is "zero" (S30: NO), the PU 62 determines whether or not notification of the start of departure avoidance control is received from the higher-level ECU 80 (S32). The start notification is reported when control to restrain the departure from the traffic lane is started by the steering intervention. In this stage, the higher-level ECU 80 also reports a steering direction for departure avoidance. When it is determined that the start notification is received (S32: YES), the PU 62 substitutes "one" for the flag F (S34). Then, the PU 62 determines whether or not steering direction for departure avoidance from the higher-level ECU 80 is the right steering direction (S36).

When it is determined to be the right steering direction (S36: YES), the PU 62 moves to the process of S38. In the process of S38, the PU 62 substitutes the right basic amount of play αR0 for a right play compensation amount αR and substitutes "zero" for a left play compensation amount αL. On the other hand, when it is determined to be the left steering direction (S36: NO), the PU 62 moves to S40. In the process of S40, the PU 62 substitutes "zero" for the right play compensation amount αR and substitutes the left basic amount of play αL0 for the left play compensation amount αL.

On the other hand, when it is determined that the flag F is "one" (S30: YES), the PU 62 determines whether or not notification of the end of departure avoidance control is received from the higher-level ECU 80 (S42). The notification of the end of departure avoidance control is output from the higher-level ECU 80 when steering intervention that is for departure avoidance is ended. The notification of the end of departure avoidance control is not for reporting the end of steering intervention itself. Hereafter, this is explained based on FIG. 5.

Figure 5:
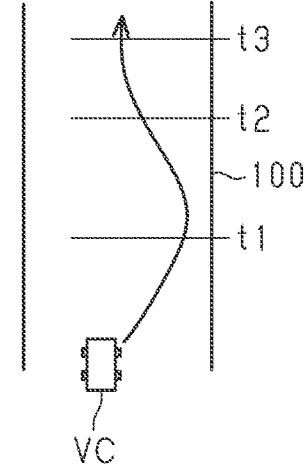
FIG. 5 is a diagram exemplarily showing departure avoidance control according to the embodiment.

FIG. 5 shows a case where a vehicle VC excessively comes close to the right side and is likely to depart from a traffic lane. In other words, a case where the vehicle VC excessively comes close to a right white line 100 is shown. In this case, at time t1, the notification of the start of departure avoidance control is output from the higher-level ECU 80. At time t2, the notification of the end of departure avoidance control is output from the higher-level ECU 80. A period from time t1 to time t2 is a period during which the steering direction is the left side or the turning angle has a value on the left turning side, and the steering angle is constant. Note that minute fluctuation of the turning angle due to feedback control is ignored. When the turning angle at time t2 is maintained, the vehicle VC is to come close to the left side of the traffic lane. Therefore, the higher-level ECU 80 further performs steering intervention from time t2 to time t3 in order to cause the vehicle VC to travel along the traffic lane. Note that during the period from time t2 to time t3, processing after the end of departure avoidance control is performed. Namely, the period from time t1 to time t2 indicates a period during which the higher-level ECU 80 performs control to cause the vehicle VC to come close to the left side. Meanwhile, the period from time t2 to time t3 indicates a period during which the higher-level ECU 80 performs control to cause the vehicle VC to travel straight relative to the traffic lane after the control of coming close to the left side.

With return to FIG. 4, when it is determined that the notification of the end of departure avoidance control is received (S42: YES), the PU 62 substitutes "zero" for the flag F (S44). Both when the process of S44 is completed and in the case of negative determination in the process of S32, the PU 62 moves to the process of S46. In the process of S46, the PU 62 substitutes the right basic amount of play αR0 for the right play compensation amount αR and substitutes the left basic amount of play αL0 for the left play compensation amount αL (S46).

Control of Turning Angle in Autonomous Steering Mode

Figure 6:
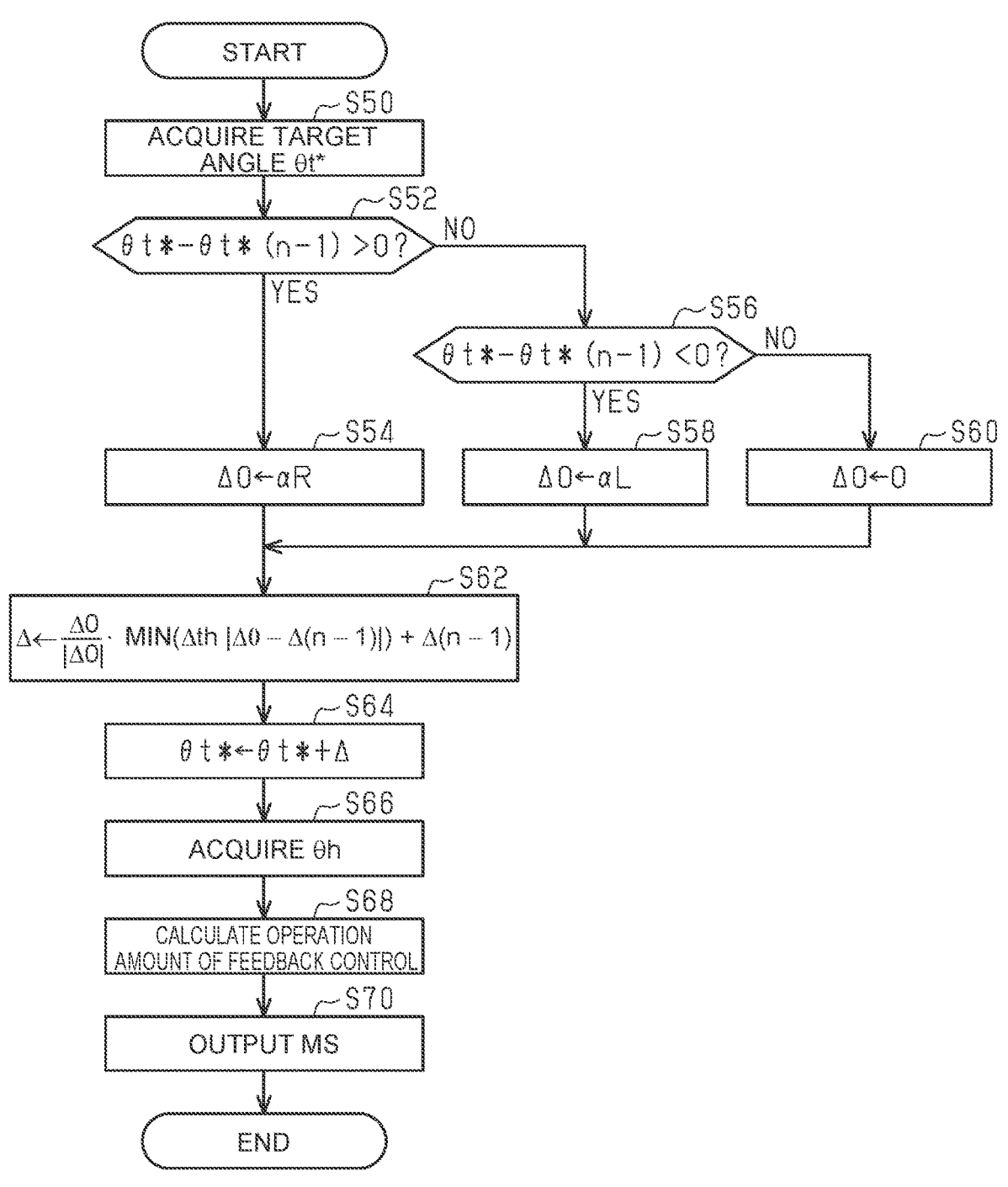
FIG. 6 is a flowchart showing a procedure of processes performed by the control apparatus according to the embodiment.

When the process of S38, S40, S46 is completed, the PU 62 tentatively ends the series of processes shown in FIG. 4. FIG. 6 shows a procedure of processes regarding control of the turning angle. The processes shown in FIG. 6 are implemented by the PU 62, in the autonomous steering mode, repeatedly executing a program stored in the storage 64, for example, in predetermined cycles.

In the series of processes shown in FIG. 6, first, the PU 62 acquires the target angle θt* output by the higher-level ECU 80 (S50). Next, the PU 62 determines whether or not the change of the target angle θt* is positive (S52). In other words, the PU 62 determines whether or not a changing direction of the target angle θt* is the right steering direction. That the changing direction of the target angle θt* is the right steering direction means that the higher-level ECU 80 makes an instruction of right steering by means of the target angle θt*. FIG. 6 illustrates, as "θt*(n−1)", the target angle θt* that is acquired in the process of S50 in the performance timing, previous by one cycle, of the series of processes according to FIG. 6.

When it is determined that the change of the target angle θt* is positive (S52: YES), the PU 62 substitutes the right play compensation amount αR for a play compensation amount Δ0 (S54). On the other hand, in the case of negative determination in the process of S52, the PU 62 determines whether or not the change of the target angle θt* is negative (S56). In other words, the PU 62 determines whether or not the changing direction of the target angle θt* is the left steering direction. When it is determined that the change of the target angle θt* is negative (S56: YES), the PU 62 substitutes the left play compensation amount αL for the play compensation amount Δ0 (S58).

In the case of negative determination in the process of S56, the PU 62 substitutes "zero" for the play compensation amount Δ0 (S60). When the process of S54, S58, S60 is completed, the PU 62 performs guard processing of limiting a magnitude of a changing speed of the play compensation amount Δ0 to the smaller side (S62). The value after the guard processing is a play compensation amount Δ. When the play compensation amount Δ that is obtained in the previous performance timing of the series of processes shown in FIG. 6 is expressed as "Δ(n−1)", the output of the process of S62 is as follows. $(\Delta 0/|\Delta 0|)\cdot\mathrm{MIN}(\Delta th|\Delta 0-\Delta(n-1)|)+\Delta(n-1)$ Herein, the upper limit 4th defines a maximum value of a magnitude of a change amount of the play compensation amount Δ per cycle of performance of the processes shown in FIG. 6.

Next, the PU 62 substitutes a value obtained by adding the play compensation amount Δ to the target angle θt* for the target angle θt* (S64). Next, the PU 62 acquires the steering angle θh (S66). Then, the PU 62 calculates an operation amount of feedback control with the steering angle θh being as a control amount and with the target angle θt* being as a target value of the control amount (S68). The operation amount may be torque of the motor 50. Next, in order to control the motor 50 in accordance with the operation amount, the PU 62 outputs an operation signal MS to the inverter 52 (S70). Thereby, for example, when the operation amount is the torque of the motor 50, the output voltage of the inverter 52 is operated such that the torque of the motor 50 becomes the operation amount. This process may be performed, for example, with the currents iu, iv, iw being as inputs.

When the process of S70 is completed, the PU 62 tentatively ends the series of processes shown in FIG. 6. Incidentally, the processes of S62 to S70 may be performed a plurality of times during the cycle where the processes of S50 to S60 are performed. In this case, the play compensation amount Δ in the previous performance timing of the process of S62 is set to "Δ(n−1)". Thereby, reliability to cause the play compensation amount Δ to converge on the play compensation amount Δ0 before the target angle θt* stops changing can be enhanced.

Operation and Effects of Present Embodiment

At the time point of the switch to the autonomous steering mode, the PU 62 sets the right basic amount of play αR0 and the left basic amount of play αL0. Then, when the target angle θt* is changed in the right steering direction, the target angle θt* is corrected in accordance with the right play compensation amount αR according to the right basic amount of play αR0. Moreover, when the target angle θt* is changed in the left steering direction, the target angle θt* is corrected in accordance with the left play compensation amount αL according to the left basic amount of play αL0.

Note that the change of the target angle θt* becomes excessively large when, at the time point when the steering direction has been changed, the play compensation amount Δ is changed stepwise to the right play compensation amount αR or the left play compensation amount αL. This causes a concern that stability and reliability of the control are lowered. This moreover causes a concern that sudden rotation of the steering wheel 12 results in a driver's feeling of discomfort.

Against this, the PU 62 gradually causes the play compensation amount Δ to come close to the play compensation amount Δ0 that is newly set along with the change of the steering direction. When the play compensation amount Δ0 is positive, this process is processing of gradually increasing the play compensation amount Δ. Thereby, the concerns above can be restrained from arising.

In particular, in the present embodiment, the magnitude of the changing speed of the play compensation amount Δ is limited to the smaller side in steering intervention by the departure avoidance control. This can restrain the driver from feeling discomfort on the steering intervention.

Note that a further effect as described below is obtained according to the present embodiment. When the right play compensation amount αR is set to the right basic amount of play αR0 and the left play compensation amount αL is set to the left basic amount of play αL0, by the steering angle θh being controlled to be the target angle θt*, the turning angle can be controlled in high accuracy in accordance with the target angle θt*. Meanwhile, there is a possibility that, for example, during the period from time t1 to time t2 exemplarily shown in FIG. 5, fine adjustment of the control causes the change of the target angle θt* to be in the right steering direction. In such a case, there arises a concern that setting the play compensation amount Δ to the right basic amount of play αR0 results in lack of stability in performing control to restrain departure from the traffic lane. Therefore, the PU 62 sets the right play compensation amount αR in such a case to zero. Thereby, stability in the control to restrain departure from the traffic lane can be secured.

Second Embodiment

Hereafter, a second embodiment, mainly its differences from the first embodiment, is described with reference to the drawings.

Figure 7:
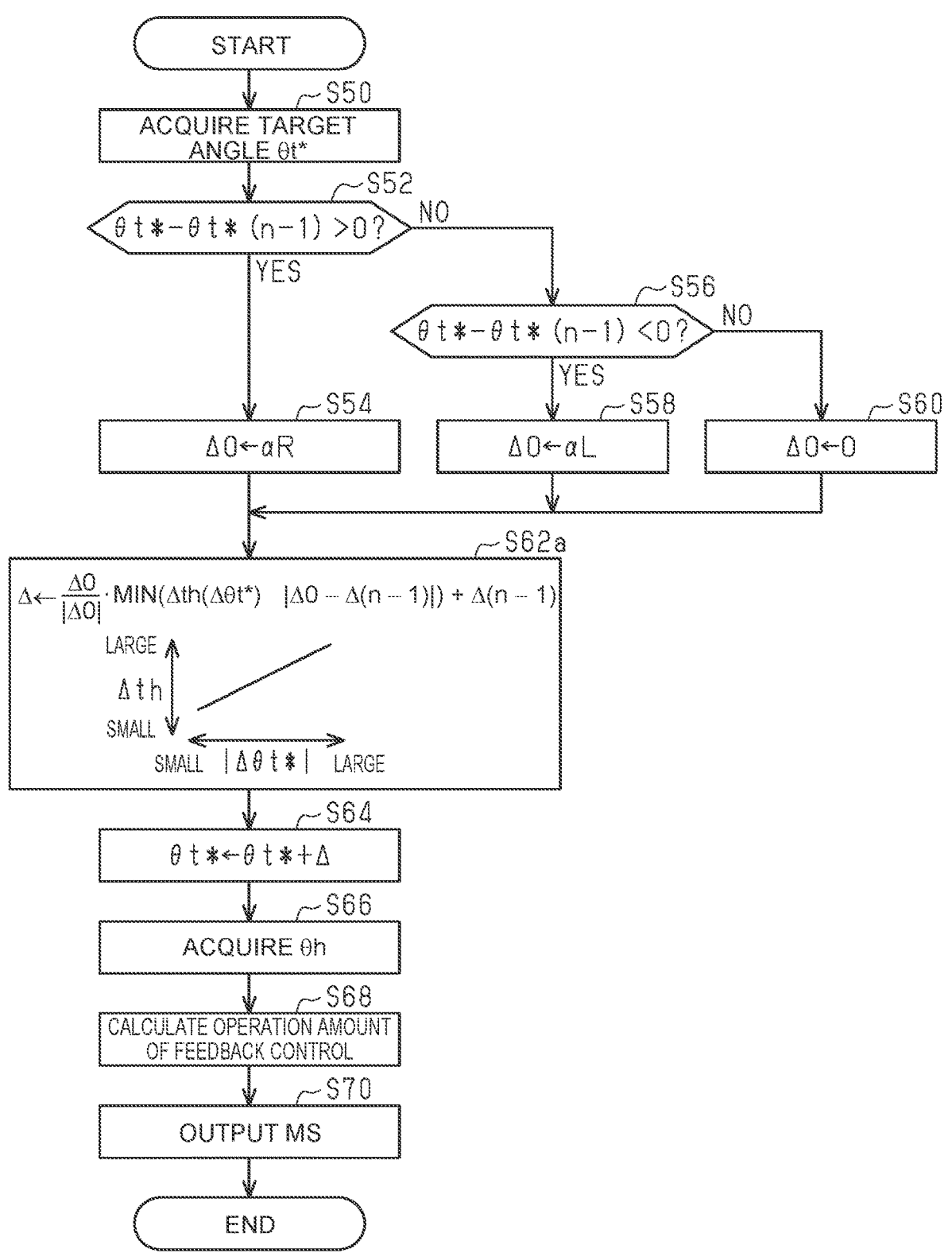
FIG. 7 is a flowchart showing a procedure of processes performed by a control apparatus according to a second embodiment.

The present embodiment takes a different way of limiting the changing speed of the play compensation amount Δ. FIG. 7 shows a procedure of processes regarding control of the turning angle according to the present embodiment. The processes shown in FIG. 7 are implemented by the PU 62, in the autonomous steering mode, repeatedly executing a program stored in the storage 64, for example, in predetermined cycles. In FIG. 7, processes corresponding to the processes shown in FIG. 6 are given the identical step numbers for convenience.

In the series of processes shown in FIG. 7, when the process of S54, S58, S60 is completed, the PU 62 performs guard processing of limiting the magnitude of the changing speed of the play compensation amount Δ0 to the smaller side (S62a). The difference between the process of S62a and the process of S62 is in setting of the upper limit Δth. In the process of S62, the upper limit Δth is a fixed value. In contrast, in the process of S62a, the upper limit Δth is changed in accordance with the changing speed of the target angle θt*.

In detail, the PU 62 sets the upper limit Δth in the case where the magnitude of the changing speed of the target angle θt* is large to be not less than the upper limit Δth in the case where the magnitude of the changing speed of the target angle θt* is small. This process may be processing of performing map operation on the upper limit Δth by the PU 62 in the state where map data is stored in the storage 64. Here, the map data is data with the absolute value of the changing speed of the target angle θt* being as an input variable and with the upper limit Δth being as an output variable.

Note that map data is data of sets of discrete values of an input variable and the corresponding values of an output variable to the individual values of the input variable. Moreover, map operation may be processing of setting, as the operation result when a value of the input variable coincides with any one of the values of the input variable in the map data, the corresponding value of the output variable in the map data. Moreover, when the value of the input variable does not coincide with any of the values of the input variable in the map data, the map operation may be processing of setting, as the operation result, a value obtained by interpolation of a plurality of values of the output variable included in the map data. Otherwise, instead, when the value of the input variable does not coincide with any of the values of the input variable in the map data, the map operation may be processing of setting, as the operation result, the value of the output variable in the map data corresponding to the closest value out of a plurality of values of the input variable included in the map data.

The value of the output variable in the map data mentioned above takes some values different from one another. When the magnitude of the changing speed of the target angle $\theta t^*$ is large, more rapid change of the steering direction is requested as compared with the case where the above magnitude of the changing speed is small. Therefore, the process of S62$a$ may afford a compromise between to handle the request for such rapid change of the steering direction and to restrain sudden rotation of the steering shaft 14.

Third Embodiment

Hereafter, a third embodiment, mainly its differences from the first embodiment, is described with reference to the drawings.

Figure 8:
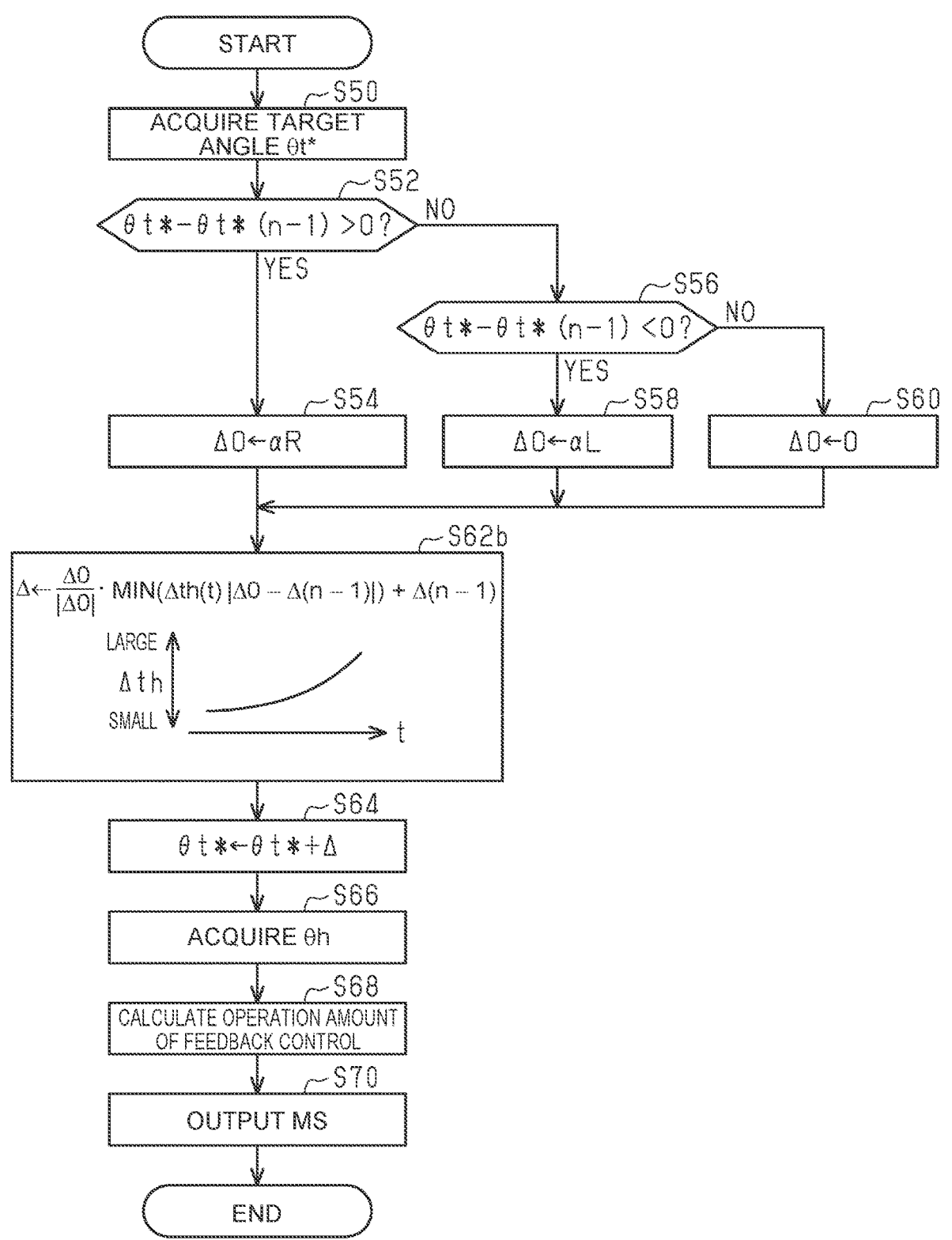
FIG. 8 is a flowchart showing a procedure of processes performed by a control apparatus according to a third embodiment.

The present embodiment takes a different way of limiting the changing speed of the play compensation amount $\Delta$. FIG. 8 shows a procedure of processes regarding control of the turning angle according to the present embodiment. The processes shown in FIG. 8 is implemented by the PU 62, in the autonomous steering mode, repeatedly executing a program stored in the storage 64, for example, in predetermined cycles. In FIG. 8, processes corresponding to the processes shown in FIG. 6 are given the identical step numbers for convenience.

In the series of processes shown in FIG. 8, when the process of S54, S58, S60 is completed, the PU 62 performs guard processing of limiting the magnitude of the changing speed of the play compensation amount $\Delta 0$ to the smaller side (S62$b$). The difference between the process of S62$b$ and the process of S62 is in setting of the upper limit $\Delta$th. In the process of S62, the changing speed of the upper limit $\Delta$th is a fixed value. In contrast, in the process of S62$b$, the changing speed of the upper limit $\Delta$th is a function of time.

In detail, the PU 62 gradually increases a gradually increasing speed of the upper limit $\Delta$th over the elapse of time. Namely, the PU 62 sets an increasing acceleration of the upper limit $\Delta$th to be positive. Specifically, for example, the upper limit $\Delta$th may be increased exponentially in accordance with time. This process may be processing of performing map operation on the upper limit $\Delta$th by the PU 62 in the state where map data is stored in the storage 64. Here, the map data is data with time being as an input variable and with the upper limit $\Delta$th being as an output variable. Otherwise, this process may be processing of substituting a value of a dependent variable of an exponential function with time being as an independent variable for the upper limit $\Delta$th.

As above, by gradually increasing the gradually increasing speed of the upper limit $\Delta$th, immediately after the switch of the play compensation amount $\Delta 0$, the change of the play compensation amount $\Delta$ is small. Then, by the change of the play compensation amount $\Delta$ being gradually increasing, the driver can be restrained from being impressed as sudden change.

Correspondences between the matters in the embodiments and the matters described in the section of SUMMARY are as follows. The correspondences are shown with the individual numbers of means for solution described in the section of SUMMARY. [1] The target steering angle variable acquiring processing corresponds to the process of S50. The target steering angle correcting processing corresponds to the process of S64. The gradually changing processing corresponds to the process of S62, S62$a$, S62$b$. The steering angle control processing corresponds to the processes of S68 and S70. [2] With the correspondence to the process of S62$a$. [3] With the correspondence to the process of S62$b$. [4] The play displacement calculating processing corresponds to the processes of S10 to S22. The basic amount setting processing corresponds to the processes of S24 and S26.

Other Embodiments

The present embodiments can be implemented with changes as described below. The present embodiments and the following modifications can be combined and implemented as long as they do not technically contradict one another.

The target steering angle variable is not limited to the value obtained by converting the turning angle of the turned wheel 40 into the rotation angle of the steering shaft 14. For example, the turning angle itself may be employed. In this case, the process of S68 may perform processing with the value obtained by converting the steering angle $\theta h$ into the turning angle being as the control amount and with the target angle being as the target value of the control amount.

In the gradually changing processing, for example, when at the time point when the target angle $\theta t^*$ stops changing, the play compensation amount $\Delta$ does not reach the play compensation amount $\Delta 0$, the play compensation amount $\Delta$ may be changed until the play compensation amount $\Delta$ reaches the play compensation amount $\Delta 0$. This means that, for example, in the case of transition from the state where the target angle $\theta t^*$ is changing to the right steering direction to the state of not changing, the play compensation amount $\Delta$ is changed to the right play compensation amount $\alpha R$.

The process of S62$b$ has set the changing speed of the gradually increasing speed of the upper limit $\Delta$th to a predefined changing speed, being not limited to this. For example, the changing speed of the gradually increasing speed of the upper limit $\Delta$th may be changed in accordance with the changing speed of the target angle $\theta t^*$.

It is not essential to set the left play compensation amount $\alpha L$ to zero in the process of S38. For example, the absolute value of the left play compensation amount $\alpha L$ may be set to be smaller than the absolute value of the left basic amount of play $\alpha L 0$ while being set to be larger than zero.

It is not essential to set the right play compensation amount $\alpha R$ to zero in the process of S40. For example, the absolute value of the right play compensation amount $\alpha R$ may be set to be smaller than the absolute value of the right basic amount of play $\alpha R 0$ while being set to be larger than zero.

The processes exemplarily shown in FIG. 4 are not essential for setting the right play compensation amount $\alpha R$ and the left play compensation amount $\alpha L$. For example, the right play compensation amount $\alpha R$ and the left play compensation amount $\alpha L$ may be caused to coincide with the right basic amount of play $\alpha R 0$ and the left basic amount of play $\alpha L 0$, respectively, at all times.

It is not essential to determine the steering direction in accordance with the processes of S52 and S56. For example, in place of the target angle $\theta t^*$ in the process of S52, a value obtained by filtering processing of the target angle $\theta t^*$ may be used. Thereby, the steering direction, due to the influence of noise, can be restrained from being determined as frequently inverting.

For the embodiments, the processing for the higher-level ECU 80 to intervene in steering when the vehicle is likely to depart from a traffic lane while the driver is manipulating the steering wheel 12 is exemplarily presented. Nevertheless, the autonomous steering processing performed in the autonomous steering mode is not limited to such processing. For example, there may be employed processing for the higher-level ECU 80 to perform steering in the state where manipulation of the steering wheel 12 by the driver is not made. Moreover, for example, there may be employed processing for the higher-level ECU 80 to intervene in steering when the vehicle is likely to contact with an obstacle while the driver is manipulating the steering wheel 12.

It is not essential that the steering angle control processing includes the processing of calculating the operation amount of feedback control with the steering angle θh being as the control amount and with the target angle θt* being as the target value of the control amount. For example, processing of calculating the operation amount of open-loop control with the steering angle θh being as the control amount and with the target angle θt* being as the target value of the control amount may be included. Otherwise, for example, processing of calculating both the operation amount of feedback control and the operation amount of open-loop control may be included.

The steering control apparatus is not limited to an apparatus that acquires the target angle θt* set by the higher-level ECU 80. For example, an apparatus having the steering control apparatus 60 and the higher-level ECU 80 integrated may be employed.

The steering control apparatus 60 is not limited to one that includes the PU 62 and the storage 64 and performs software processing. For example, an exclusive hardware circuit (such, for example, as an ASIC) that performs hardware processing on at least one or some of the things that undergo software processing in the embodiments may be included. Namely, the steering control apparatus may take any of the configurations (a) to (c) below. (a) Including a processing unit that performs all of the processes above in accordance with a program and a program storing apparatus, such as a ROM, that stores the program. (b) Including a processing unit that performs one or some of the processes above in accordance with a program, a program storing apparatus, and an exclusive hardware circuit that performs the rest of the processes. (c) Including an exclusive hardware circuit that performs all of the processes above. Here, a plurality of software processing circuits including the processing unit and the program storing apparatus, and/or a plurality of exclusive hardware circuits may be included. Namely, the processes above may be performed by a processing circuit including at least one of one or a plurality of software processing circuits and one or a plurality of exclusive hardware circuits.

What is claimed is:

1. A steering control apparatus to control a steering system, the steering system includes a steering shaft, a turned wheel of a vehicle, the turned wheel being turned along with rotation of the steering shaft, and a motor that rotates the steering shaft; and the steering control apparatus comprising a processing unit configured to execute;

a target steering angle variable acquiring processing of acquiring a value of a target steering angle variable, the target steering angle variable being a variable indicating a target value of a turning angle of the turned wheel;

a target steering angle correcting processing of correcting the value of the target steering angle variable by a play compensation amount according to a steering direction, the steering direction being a direction in which the value of the target steering angle variable changes;

a gradually changing processing of gradually changing a magnitude of the play compensation amount, the play compensation amount being set for correcting the value of the target steering angle variable along with a change of the steering direction; and a steering angle control processing of operating the motor through control with a steering angle according to a rotation angle of the steering shaft being as a control amount and with the value of the target steering angle variable being as a target value of the control amount.

2. The steering control apparatus according to claim 1, wherein the gradually changing processing includes processing of defining a changing speed of the magnitude of the play compensation amount in accordance with a magnitude of a changing speed of the value of the target steering angle variable, and the changing speed of the magnitude of the play compensation amount in a case where the magnitude of the changing speed of the value of the target steering angle variable is large is set to be not less than the changing speed of the magnitude of the play compensation amount in a case where the magnitude of the changing speed of the value of the target steering angle variable is small.

3. The steering control apparatus according to claim 1, wherein the gradually changing processing includes processing of gradually increasing a changing speed of the magnitude of the play compensation amount along with the change of the steering direction.

4. The steering control apparatus according to claim 1, wherein:

the processing unit is configured to perform the steering angle control processing in an autonomous steering mode, and is configured to perform play displacement calculating processing and basic amount setting processing;

the play displacement calculating processing is processing of calculating a play displacement in accordance with each change of the steering angle, and the play displacement is an amount for specifying a position in a region where the turning angle does not change with respect to the change of the steering angle;

the basic amount setting processing is processing of setting a basic amount of play according to a right steering direction and a basic amount of play according to a left steering direction to amounts for setting the steering angle to a value of an end part of the region, in accordance with the play displacement at a time point of entering the autonomous steering mode; and the gradually changing processing is processing of gradually changing the play compensation amount to the basic amount of play.

* * * * *